(12) United States Patent
Wahls

(10) Patent No.: US 8,038,218 B2
(45) Date of Patent: Oct. 18, 2011

(54) TAPERED RETAINER CLIP FOR RECLINING MECHANISM FOR VEHICLE SEATS

(75) Inventor: Robert Wahls, Commerce Township, MI (US)

(73) Assignee: Lear Corporation, Southfield, MI (US)

( * ) Notice: Subject to any disclaimer, the term of this patent is extended or adjusted under 35 U.S.C. 154(b) by 154 days.

(21) Appl. No.: 12/554,296

(22) Filed: Sep. 4, 2009

(65) Prior Publication Data

US 2011/0057493 A1   Mar. 10, 2011

(51) Int. Cl.
*B60N 2/235* (2006.01)

(52) U.S. Cl. .............. 297/367 P; 297/367 R; 297/367 L

(58) Field of Classification Search .............. 297/367 P, 297/367 L, 367 R
See application file for complete search history.

(56) References Cited

U.S. PATENT DOCUMENTS

| | | | |
|---|---|---|---|
| 5,005,906 A | 4/1991 | Suzuki et al. | |
| 5,123,703 A | 6/1992 | Morris et al. | |
| 5,156,439 A | 10/1992 | Idlani et al. | |
| 5,212,868 A | 5/1993 | Morris et al. | |
| 5,871,259 A | 2/1999 | Gehart | |
| 7,195,318 B2 | 3/2007 | Cha et al. | |
| 7,404,604 B2 | 7/2008 | Nag et al. | |
| 7,517,021 B2 * | 4/2009 | Wahls et al. | ............... 297/367 R |
| 2008/0073961 A1 * | 3/2008 | Wahls et al. | ................... 297/367 |
| 2008/0073962 A1 * | 3/2008 | Wahls et al. | ................... 297/367 |
| 2008/0093907 A1 | 4/2008 | Nag et al. | |

* cited by examiner

*Primary Examiner* — Rodney B White
(74) *Attorney, Agent, or Firm* — Brooks Kushman P.C.

(57) ABSTRACT

A recliner mechanism for a vehicle seat includes a guide plate and a gear plate. The gear plate has a plurality of internal gear teeth and a frustonical inner diameter. A hub is attached to a shaft that connects two recliners on opposite sides of the seat. The guide plate, the gear plate and a cam are retained on the hub by a retainer clip that has a frustoconical bearing surface. Two locking elements cooperate with the guide plate, and have a plurality of external gear teeth that selectively engage the internal gear teeth. When the cam rotates, the cam engages the cam surfaces with one of the engagement surfaces unlocking the external gear teeth from the internal gear teeth. Springs cooperate with the guide plate and the cam for locking the mechanism. The inner diameter of the gear plate is received on the frustoconical bearing surface of the retainer clip.

11 Claims, 2 Drawing Sheets

TAPERED RETAINER CLIP FOR RECLINING MECHANISM FOR VEHICLE SEATS

BACKGROUND OF THE INVENTION

1. Field of the Invention

This invention relates reclining mechanisms for vehicle seating assemblies and, more specifically, to manually operated reclining mechanisms.

2. Background Art

Vehicle seats normally include a seat base and a seat back that are connected by a reclining mechanism that allows the seat back to be positioned to accommodate different body types and the personal comfort of seat occupants. Reclining mechanisms for vehicle seats permit the seat back to pivot to allow a passenger to recline or incline the seat.

Manually operated reclining mechanisms have a locked position in which the seat back cannot pivot and an unlocked position in which the seat back can be pivoted. The reclining mechanism is manually moved from a locked position to an unlocked position. Full engagement of the reclining mechanism must be assured in the locked position after adjusting the reclining mechanism.

Reclining mechanisms must meet or exceed performance specifications and must be simple for customers to use. The components of reclining mechanisms must be manufactured to close tolerances to assure acceptable performance. Components that do not meet tolerances requirements for components may lead to inconsistent results, unacceptable levels of scrap, and other manufacturing problems.

Recliner mechanisms generally include a gear plate and a guide plate that rotate relative to each other. Both plates may be formed of metal in a fine blanking operation to meet the required close tolerances. The gear plate and the guide plate may create a scraping noise when the recliner is used to adjust the position of the seat back. The scraping noise is caused by metal-to-metal contact between the gear plate and the guide plate. If the guide plate has a bearing surface proximate the gear teeth of the gear plate, there is a substantial likelihood of a scraping noise being created by the guide plate coming into contact with the gear teeth.

Reclining mechanisms are crash tested to verify performance of the mechanism. Manual reclining mechanisms include locking elements that are biased into engagement with the teeth of one of the gear plates by a spring to hold the seat in a desired orientation. The seat is adjusted by shifting the locking elements into a disengaged position in which the locking elements do not engage the teeth and then moving the seat back to the desired position. One criteria for crash testing of such reclining mechanisms is that they should not permit disengagement of the locking elements in the test.

The present invention is directed to overcoming the above problems and other problems that are addressed by this invention as summarized below.

SUMMARY OF THE INVENTION

A reclining mechanism for a vehicle seat is provided that has a guide plate adapted to be secured to one of a seat bottom or a seat back and a gear plate adapted to be secured to the other of the seat bottom or seat back. The gear plate is pivotally connected to the guide plate about a pivotal axis. The gear plate is provided with a plurality of gear teeth. A cam is provided that is pivotally connected to the gear plate. The cam has at least two cam surfaces. At least two lock elements are provided that cooperate with the guide plate and the cam for translation relative to the guide plate. The lock elements each have an external gear segment on a radially outwardly oriented portion of each lock element that cooperate with the gear teeth. The lock elements each provide an engagement element that cooperate with the cam pawl. Rotation of the cam causes the engagement elements of the cam surfaces to move the lock elements radially inwardly. The external gear teeth are unlocked from each of the internal gear teeth when the lock elements are moved radially inwardly. Two springs are provided on the guide plate for urging the cam to drive the external gear teeth into engagement with the internal gear teeth. A clip is assembled into an opening that forms an inner diameter of the gear plate. The clip forms a frustoconical bearing surface upon which a frustonical inner diameter bearing surface of the gear plate rotates relative to the guide plate. The clip is spaced from the cam. The frustoconical bearing surfaces cooperate to create a wedge effect that prevents the clip from contacting the cam and releasing the locking elements in a crash test.

A reclining system for use in a vehicle is provided that has a pair of reclining mechanisms. Each of the pair of reclining mechanisms includes a guide plate that is adapted to be secured to one of a seat bottom or a seat back and a gear plate that is adapted to be secured to the other of the seat bottom or seat back. The gear plate is connected to the guide plate to pivot about a pivotal axis. The gear plate is provided with internal gear teeth. A cam is provided with at least two cam surfaces. Two lock elements cooperate with the guide plate and the cam. The lock elements each have a radially outwardly oriented gear segment that engages the internal gear teeth. Each of the lock elements have an engagement element that cooperates with one of the cam surfaces. The cam is rotated to cause the cam surfaces to contact the engagement elements of the lock elements to unlock the external gear teeth from the internal gear teeth. Springs are provided that cooperate with the guide plate and the cam to urge the cam to translate the lock element which causes external gear teeth to engage the internal gear teeth of the gear plate. A bushing causes the cam to rotate about the pivotal axis. The bushing is configured to receive a shaft that connects one of the reclining mechanisms to a second reclining mechanism. A clip is assembled between the bushing and the gear plate. The clip provides a bearing surface for the gear plate that receives the clip within an inner diameter of an opening in the gear plate. The clip has a partially conical bearing surface upon which a partially conical inner diameter bearing surface of the gear plate rotates relative to the guide plate. The partially conical bearing surfaces cooperate to prevent the clip from contacting the cam or releasing the locking elements.

A seat assembly for use in a vehicle is provided with a seat bottom, a seat back, a pair of reclining mechanisms and a shaft. A bushing receives a shaft that connects the pair of reclining mechanisms. Each of the reclining mechanisms has a guide plate that is adapted to be secured to the seat bottom and a gear plate that is adapted to be secured to the seat back which is pivotally connected to the guide plate about a pivotal axis. Each gear plate is provided with internal gear teeth and has an inner diameter. A cam is provided that has at least two cam surfaces. Two lock elements are moved by the cam relative to the guide plate. The lock elements each have an external gear segment that faces radially outwardly to cooperate with one of the internal gear teeth. The cam engages each lock element at two contact points to drive the external gear teeth into the internal gear teeth when the pair of reclining mechanisms is in a locked position. The lock elements each have an engagement element that cooperates with the cam pawl. The cams rotate to cause the cam surfaces to engage the engagement elements at one contact point to move the lock elements. The cam is pivoted to unlock the external gear teeth from the internal gear teeth. Two springs cooperate with the guide plate and the cam to urge the cam to move the external gear teeth into engagement with the internal gear teeth. A retainer clip is attached to the bushing and has a bearing surface that receives the inner diameter of the gear plate. The clip forms a bearing surface that is wider at its outer axial end than at its inner axial end. The gear plate defines an inner diameter bearing surface that has a larger diameter at the outer axial end than the diameter of the inner axial end. The gear plate rotates relative to the guide plate with the gear plate inner diameter bearing surface rotating on the bearing surface of the clip.

These and other features of the invention will be better understood in view of the attached drawings and the following detailed description of the illustrated embodiment.

DETAILED DESCRIPTION OF EMBODIMENTS OF THE INVENTION

Figure 1:
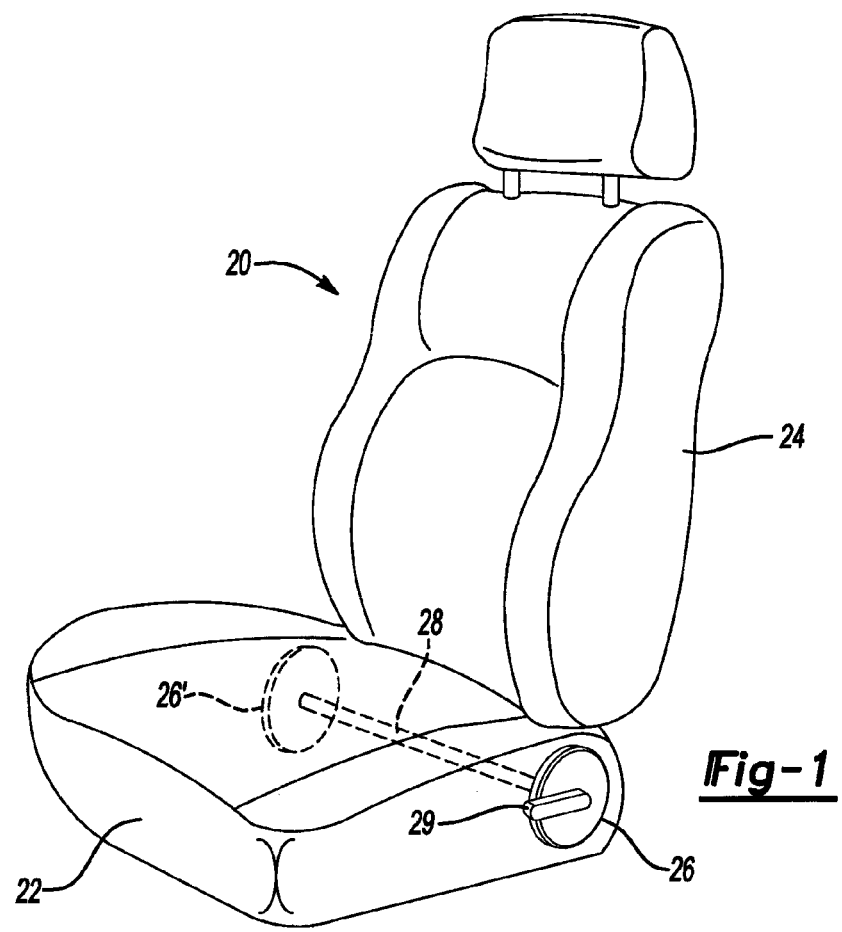
FIG. 1 is a perspective view of a seat assembly.

Referring now to FIG. 1, a seat assembly is illustrated and referenced generally by numeral 20. The seat assembly 20 includes a generally horizontal seat base 22. The seat assembly 20 also includes an upright seat back 24. A pair of reclining mechanisms 26, 26' connect the seat base 22 to the seat back 24. The reclining mechanisms 26, 26' are connected together by a shaft 28. The shaft 28 links the reclining mechanisms 26, 26' so that a handle 29 may be used to lock or unlock the seat back 24 relative to the seat bottom 22.

Figure 2:
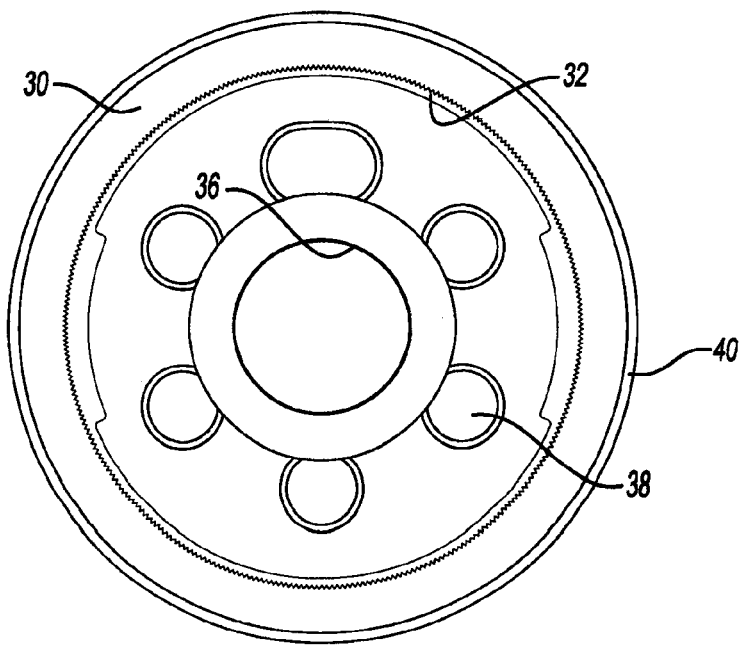
FIG. 2 is an inside elevation view of one embodiment of a gear plate of a reclining mechanism.

Referring to FIG. 2, the inner surface of a gear plate 30 is shown that forms part of the reclining mechanism 26. The gear plate 30 has a ring of internal gear teeth 32 that are inwardly oriented teeth provided on an axially extending cylindrical surface of the gear plate 30. An inner diameter 36, or bearing surface, is defined by the gear plate 30. The inner diameter 36 comprises a frustoconical bearing surface of a central opening provided in the gear plate 30. A plurality of welding lands 38 are arrayed about the inner diameter 36. The welding lands 38 are intended to be welded to a seat back or seat base and may be welded by a MIG welder, laser welder, or the like. A case 40 extends across the width of the gear plate 30 to hold the reclining mechanism 26 together, as will be more fully described with reference to FIGS. 3 and 4 below.

Figure 3:
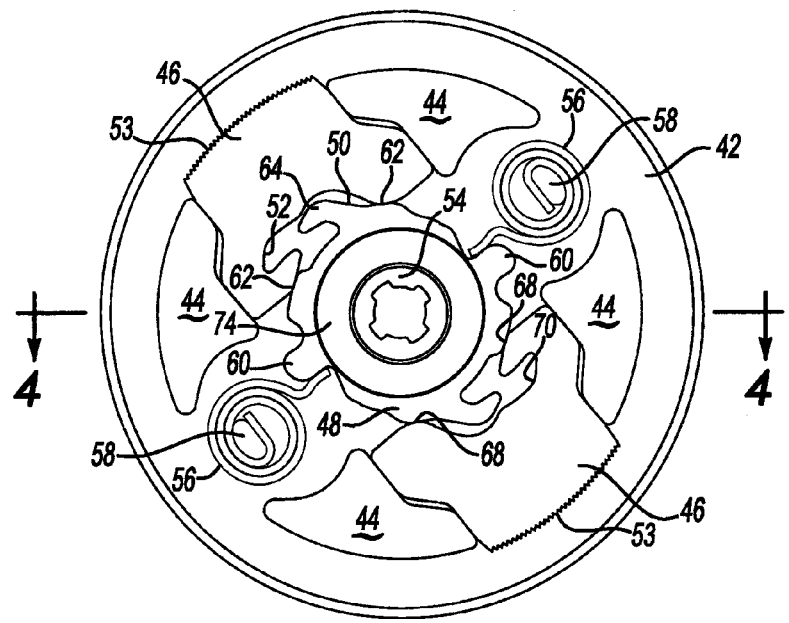
FIG. 3 is an inside elevation view of the guide plate, cam, locking elements, and springs of the reclining mechanism of FIG. 2.

Referring to FIG. 3, the inside of a guide plate 42 is shown to include a plurality of guide features 44, or guide sections. The guide features 44 are formed in the guide plate 42 in a metal stamping operation. The guide features 44 guide translational movement of locking elements 46. The locking elements 46 are engaged by a cam 48. Cam 48 includes a cam surface 50 that is adapted to engage a cam engagement surface 52 formed on one side of the locking elements 46. The cam 48 is pivoted to cause the cam surface 50 to engage the cam engagement surface 52 of the locking elements 46 to move the locking elements radially inwardly and outwardly. Each of the locking elements 46 have a plurality of external teeth 53 that engage the internal teeth 32 when the locking elements are moved radially outwardly.

A hub 54 receives the gear plate 30, guide plate 42 and cam 48. Springs 56 are secured to spring retainers 58 that may be integrally formed on the guide plate 42. The springs 56 engage spring engagement lobes 60 that are provided on the cam 48. The springs 56 bias the cam 48 into the position shown in FIG. 3 with the locking elements 46 being extended and external teeth 53 engage the inner teeth 32 shown in FIG. 2.

Referring more specifically to the cam surface 50 and cam engagement surface 52, a pair of shoulders 62 are formed on the cam 48 on opposite sides of a cam hook 64. The shoulders 62 engage the cam engagement surface 52 of the locking elements 46 at two spaced engagement points 68. A hook receiver 70 is provided between the two spaced engagement points 68 for receiving one of the cam hooks 64. The cam hooks 64 are rotated into engagement with the hook receiver 70 to pull the locking elements 46 radially inwardly while being guided by the guide features 44.

Figure 4:
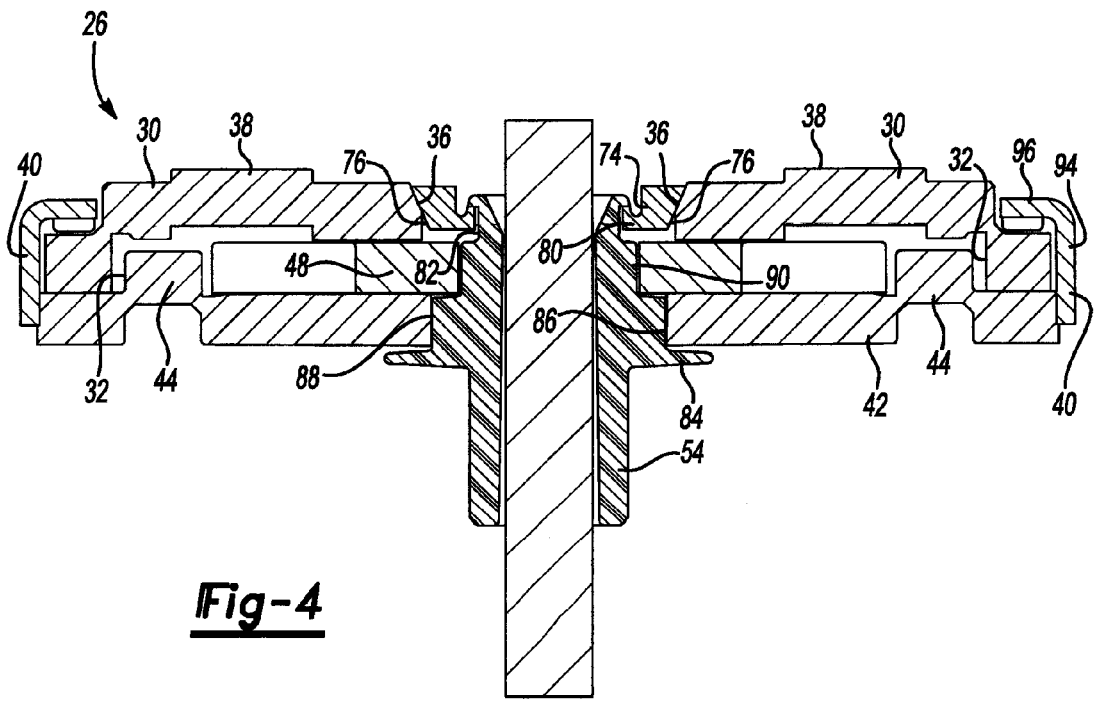
FIG. 4 is a cross-sectional view of the reclining mechanism taken along the line 4-4 in FIG. 3.

Referring to FIG. 4, a clip 74 is shown to provide a frustoconical bearing surface 76 against which the inner diameter/frustoconical bearing surface 36 bears as the reclining mechanism 26 is manipulated. The term frustoconical, as used herein, refers to a surface that is at least partially in the form of a frustum of a cone. The wider portion of the bearing surfaces 76, 36 are on the axially outboard end of the clip 74 and gear plate 30. The axially inner end of the clip 74 is spaced from the cam 48 when installed and under normal operating conditions. The wedge effect created by the interface of the two frustoconical bearing surfaces prevents the clip from side loading the cam 48 in crash tests. The clip 74 includes a lip 80 that is received in a groove 82 formed in the hub 54. The lip 80 retains the reclining mechanism 26 on the hub 54 by capturing the reclining mechanism 26 between clip 74 and a radial flange 84 that is formed to extend radially outwardly from the hub 54 inboard of the guide plate 42.

A bearing surface 86 is provided on the hub 54 that is engaged by an inner diameter 88 of the guide plate 42. The guide plate 42 is permitted to rotate relative to the hub 54 with the inner diameter 88 of the guide plate 42 riding on the bearing surface 86 formed on the hub 54.

A cam receiving ring 90 is provided on the hub 54 for receiving the cam 48. The cam 48 is non-rotatably secured to the cam receiving ring 90 by means of splines or other connecting elements so that as the hub 54 is pivoted, the cam 48 is positively engaged by the hub 54.

The handle 29 is used to pivot the hub 54. The handle 29 may be secured to the hub 54 by means of splines (not shown) as is well known in the art.

The gear plate 30 is secured to the guide plate 42 by means of the case 40. Case 40 is a cup-shaped annular member that includes an axially extending rim 94 and a radially inwardly extending flange 96. The axially extending rim 94 is welded or otherwise secured to the guide plate 42. The radially inwardly extending flange 96 of the case 40 extends on the other side of the gear plate 30 from the guide plate 42 and captures the gear plate between the radially inwardly extending flange 96 and the guide plate 42. A plastic ring may be provided inside the radially inwardly extending leg to reduce friction. The ring may be formed of polytetrafluoroethylene (PTFE) to further reduce friction and promote smooth movement of the gear plate 30 relative to the guide plate 42 when the recliner 26 is adjusted.

As shown in FIG. 4, a substantial space is provided between the guides 44 and the teeth 32 to prevent unwanted noise caused by the teeth 32 engaging the guides 44 as the gear plate 30 is rotated relative to the guide plate 42. The inner diameter 36 of the gear plate 30 tightly engages the bearing surface 76 of the clip 74 so that the gear plate 30 can rotate smoothly relative to the guide plate 42.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A reclining mechanism for a vehicle seat that is connected to a second reclining mechanism by a shaft, the reclining mechanism comprising:
    a guide plate adapted to be secured to one of a seat bottom or a seat back, the guide plate having a central opening and a plurality of guide sections;
    a gear plate adapted to be secured to the other of the seat bottom or the seat back, the gear plate having a frustoconical inner diameter, and the gear plate having a plurality of internal gear teeth;
    a hub is received in the central opening of the guide plate;
    a clip is assembled between the inner diameter of the gear plate and the hub, the clip provides a bearing surface that engages the inner diameter of the gear plate for rotation of the gear plate relative to the guide plate;
    a cam is pivotally disposed between the guide plate and the gear plate;
    at least one locking element is disposed between the guide plate and the gear plate, the locking element is moved by rotation of the cam and is guided by the guide features for translation relative to the guide plate, the locking element has external gear teeth that engages the internal gear teeth of the gear plate, the locking element has a cam engagement surface that cooperates with the cam, wherein rotation of the cam causes the cam to engage one of the cam engagement surfaces to draw the locking elements inwardly to disengage the external gear teeth from the internal gear teeth; and
    at least one spring is attached to the guide plate to bias the external gear teeth of the locking element into engagement with the internal gear teeth of the gear plate;
    wherein the gear plate pivots on the bearing surface of the clip when the cam is rotated to disengage the external teeth of the locking element from the internal teeth of the gear plate.

2. The reclining mechanism of claim 1 wherein the clip is attached to the hub by a radially inwardly oriented lip that is received by a groove in the hub.

3. The reclining mechanism of claim 1 wherein the clip includes a frustoconical bearing surface that is assembled to the hub to secure the guide plate and gear plate together on opposite sides of the cam and locking elements.

4. The reclining mechanism of claim 1 wherein the guide sections have a radially outwardly facing outer surface that is spaced radially inward from the internal gear teeth.

5. The reclining mechanism of claim 1 wherein the guide plate has a case that is secured to the guide plate and extends across the outer periphery of the gear plate, the case having a radially inwardly oriented flange that retains the gear plate in a position adjacent the guide plate.

6. The reclining mechanism of claim 1 wherein the gear plate pivots on the clip as the gear plate pivots relative to the guide plate.

7. A reclining system for use in a vehicle comprising:
    a pair of reclining mechanisms each including:
        a guide plate adapted to be secured to one of a seat bottom or a seat back;
        a gear plate adapted to be secured to the other of the seat bottom or the seat back pivotally connected to the guide plate about a pivotal axis, the gear plate has a plurality of internal gear teeth, and a partially conical inner diameter;
        a cam is pivotally disposed between the guide plate and the gear plate, the cam having at least two cam surfaces;
        two locking elements cooperate with the guide plate and the cam for translation relative to the guide plate, the locking elements each have external gear teeth that cooperate with the internal gear teeth, the locking elements each have a cam engagement surface that cooperates with one of the cam surfaces, wherein rotation of the cam causes each of the cam surfaces to engage one of the cam engagement surfaces to urge inward radial movement of the external locking elements which unlocks each of the external gear teeth from the internal gear teeth;
        at least one spring attached to the guide plate to bias the cam pivotally to drive the external gear teeth into engagement with the internal gear teeth;
        a hub receives a shaft that connects the reclining mechanism to a second reclining mechanism;
        a clip is assembled between the hub and the inner diameter of the gear plate, the clip providing a bearing surface that engages the inner diameter of the gear plate for rotation of the gear plate on the bearing surface of the clip; and
    a shaft receives the hubs of the pair of reclining mechanisms on opposite ends to coordinate the operation of the pair of reclining mechanisms;
    wherein when the shaft is rotated manually each of the hubs causes each of the cams to rotate, each of the cam surfaces engages each of the cam engagement surface to move the locking elements radially inwardly to unlock each of the gear plates allowing the partially conical inner diameter of the gear plates to rotate on the bearing surface of the clips.

8. The reclining system of claim 7 wherein the clip is attached to the hub by a radially inwardly oriented lip that is received by a groove in the hub.

9. The reclining system of claim 8 further comprising a handle attached to the hub, wherein the handle is pressed in one direction to overcome the bias of the spring and allowing for the gear plate to rotate relative to the guide plate.

10. A seat assembly for use in a vehicle comprising:
    a seat bottom;
    a seat back;
    a pair of reclining mechanisms each including:
        a guide plate adapted to be secured to the seat bottom;
        a gear plate adapted to be secured to the seat back, the gear plate has a first bearing surface that has an inner diameter that is wider at the outer axial end than at its inner axial end, and wherein the gear plate has a plurality of internal gear teeth,
        a cam having at least two cam hooks is pivotally disposed between the guide plate and the gear plate;
        two locking elements cooperate with the guide plate and the cam for translation relative to the guide plate, the locking elements each have a plurality of external gear teeth that cooperate with the internal gear teeth, wherein the cam engages each lock element to drive the external gear teeth into the internal gear teeth when the pair of reclining mechanisms is in a locked position, the locking elements each have an engagement surface that cooperates with one of the cam surfaces, wherein rotation of the cam causes each of the cam hooks to retract the locking elements in an inward radial direction which unlocks the external gear teeth of the locking element from the internal gear teeth;

two springs attached to the guide plate bias the cam pivotally to drive the external gear teeth of the lock elements into engagement with the internal gear teeth;

a bushing receives a shaft that connects the reclining mechanism to a second reclining mechanism to cause cooperation between the pair of reclining mechanisms; and a retainer clip is attached to the bushing, the retainer clip has a bearing surface that is wider at the outer axial end than at its inner axial end and that is engaged with that has a second bearing surface that engages the inner diameter of the gear plate that defines a the first bearing surface, wherein the inner diameter first bearing surface of the gear plate is rotatable on the second bearing surface of the clip;

wherein the shaft is manually rotated to rotate the bushings and the cams, wherein rotation of the cams pulls the locking elements radially inwardly to unlock each of the gear plates to rotate and thereby allowing the seat back to be adjusted.

11. The seat assembly of claim 10 wherein the second bearing surface is wider at the axial outer end of the clip than at the axial inner end of the clip.

* * * * *

UNITED STATES PATENT AND TRADEMARK OFFICE
CERTIFICATE OF CORRECTION

| | | |
|---|---|---|
| PATENT NO. | : 8,038,218 B2 | Page 1 of 1 |
| APPLICATION NO. | : 12/554296 | |
| DATED | : October 18, 2011 | |
| INVENTOR(S) | : Robert Wahls | |

It is certified that error appears in the above-identified patent and that said Letters Patent is hereby corrected as shown below:

Column 8, Line 1-2, Claim 10:

After "that is engaged with" delete "that has"

Column 8, Line 3, Claim 10:

After "gear plate that defines" delete "a"

Signed and Sealed this
Twentieth Day of March, 2012

David J. Kappos
*Director of the United States Patent and Trademark Office*